US011396359B2

(12) United States Patent
Holstine et al.

(10) Patent No.: US 11,396,359 B2
(45) Date of Patent: Jul. 26, 2022

(54) DEPLOYABLE OVERHEAD PROTECTION ASSEMBLY AND METHODS OF USE FOR CANOPY FRAGILIZATION SYSTEM

(71) Applicant: AMI INDUSTRIES, INC., Colorado Springs, CO (US)

(72) Inventors: Steven A. Holstine, Colorado Springs, CO (US); Nathan Eischeid, Cedar Rapids, IA (US); Bradley Mastrolia, Colorado Springs, CO (US); John Hampton, Colorado Springs, CO (US); Neil Cross, Peyton, CO (US); Kassidy L. Carson, Colorado Springs, CO (US); Ian Walter Haas, Colorado Springs, CO (US); Patrick Emmett Hyde, Colorado Springs, CO (US); Aaron H. Keene, Colorado Springs, CO (US); Cyle Teal, Colorado Springs, CO (US); John Wade, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 114 days.

(21) Appl. No.: 16/983,828

(22) Filed: Aug. 3, 2020

(65) Prior Publication Data

US 2022/0033057 A1 Feb. 3, 2022

(51) Int. Cl.
*B64D 25/10* (2006.01)
*B64C 1/32* (2006.01)
(52) U.S. Cl.
CPC ................ *B64C 1/32* (2013.01); *B64D 25/10* (2013.01)

(58) Field of Classification Search
CPC .................................. B64C 1/32; B64D 25/10
See application file for complete search history.

(56) References Cited

U.S. PATENT DOCUMENTS

| 3,525,490 | A | * | 8/1970 | Duncan | .................. | A47B 96/20 |
| | | | | | | 244/122 R |
| 3,561,703 | A | | 2/1971 | Stencel | | |
| 3,880,387 | A | | 4/1975 | Martin, Jr. | | |
| 4,480,806 | A | | 11/1984 | Duncan | | |
| 4,570,879 | A | | 2/1986 | Dupin | | |

(Continued)

FOREIGN PATENT DOCUMENTS

GB 2551425 12/2017

OTHER PUBLICATIONS

United Kingdom Intellectual Property Office, United Kingdom Search Report dated Sep. 20, 2021 in Application No. GB2111199.2.

*Primary Examiner* — Richard G Davis
(74) *Attorney, Agent, or Firm* — Snell & Wilmer L.L.P.

(57) ABSTRACT

A canopy fragilization system for use in an aircraft ejection system may comprise: a sharp breaker disposed on a first side of an ejection seat, the sharp breaker configured to act as a primary breaker of a canopy of an aircraft; a blunt breaker disposed on a second side of the ejection seat, the blunt breaker configured to act as a secondary breaker of the canopy of the aircraft; and a deployable overhead protection assembly comprising a mitt extending forward of the sharp breaker and the blunt breaker when in a deployed position, a forward end of the mitt configured to act as a tertiary breaker of the canopy of the aircraft.

14 Claims, 6 Drawing Sheets

(56) References Cited

U.S. PATENT DOCUMENTS

| | | | |
|---|---|---|---|
| 6,315,245 B1 * | 11/2001 | Ruff | B64D 25/02 244/122 AG |
| 7,699,265 B2 | 4/2010 | Mastrolia | |
| 10,131,438 B2 | 11/2018 | Benjamin et al. | |
| 2009/0045285 A1 * | 2/2009 | Mastrolia | B64D 25/10 244/122 AG |
| 2010/0155535 A1 * | 6/2010 | Mastrolia | B64D 25/10 244/122 AG |
| 2020/0189757 A1 | 6/2020 | Salois et al. | |

* cited by examiner

DEPLOYABLE OVERHEAD PROTECTION ASSEMBLY AND METHODS OF USE FOR CANOPY FRAGILIZATION SYSTEM

FIELD

The present disclosure relates to escape systems, and more specifically, to deployable overhead protection assemblies for ejection systems.

BACKGROUND

Ejection systems are designed to expel pilots from an aircraft cockpit. Ejection seats in high performance aircraft benefit from safely removing the pilot or other occupant from the disabled aircraft across a wide variety of aircraft speed regimes, altitudes and aircraft attitudes. During a backup mode ejection, where a transparency/canopy is not previously fragilized, load transfer may potentially be transferred from the canopy to an occupant's head if the transparency does not sufficiently break.

SUMMARY

A deployable overhead protection assembly is disclosed herein. The deployable overhead protection assembly may comprise: a base configured to pivotably couple to a headrest of an ejection seat; a first stabilizer extending from a first side of the base, the first stabilizer configured to extend a first forward distance from the headrest when in a deployed position; a second stabilizer extending from a second side of the base, the second side opposite the first side; and a mitt coupled to the base and disposed laterally between the first stabilizer and the second stabilizer, the mitt extending a second forward distance from the headrest when in the deployed position, wherein a forward end of the mitt is configured to act as a tertiary breaker in a canopy fragilization system of an aircraft.

In various embodiments, the second forward distance being between about 1.5 to 2.5 times the first forward distance. The mitt may comprise a piercer disposed at a forward end of the mitt. The mitt may be configured to extend past an occupant's head when in the deployed position. A forward end of the mitt may be configured to propagate a crack in a canopy of an aircraft forward in response to an ejection event of the ejection seat. The mitt may be configured to contact a canopy of an aircraft prior to an occupant contacting the canopy of the aircraft.

A canopy fragilization system for use in an aircraft ejection system is disclosed herein. The canopy fragilization system may comprise: a sharp breaker disposed on a first side of an ejection seat, the sharp breaker configured to act as a primary breaker of a canopy of an aircraft; a blunt breaker disposed on a second side of the ejection seat, the blunt breaker configured to act as a secondary breaker of the canopy of the aircraft; and a deployable overhead protection assembly comprising a mitt extending forward of the sharp breaker and the blunt breaker when in a deployed position, a forward end of the mitt configured to act as a tertiary breaker of the canopy of the aircraft.

In various embodiments, the blunt breaker is configured to propagate a first crack generated from the sharp breaker laterally, and the forward end of the mitt is configured to propagate a second crack generated from the blunt breaker and the first crack forward along the canopy. The mitt may be configured to extend forward of a head of an occupant when in the deployed position. The deployable overhead protection assembly may further comprise a piercer disposed at the forward end of the mitt. The piercer may comprise a bracket portion and a sharp portion, the bracket portion coupled to the mitt, the sharp portion configured to pierce the canopy. The deployable overhead protection assembly may further comprise a base, a first stabilizer extending from a first side of the base and a second stabilizer extending from a second side of the base, the mitt coupled to the base and disposed laterally between the first stabilizer and the second stabilizer. The first stabilizer may extend a first forward distance from a headrest when in the deployed position, the mitt may extend a second forward distance from the headrest when in the deployed position. The second forward distance may be between about 1.5 to 2.5 times the first forward distance. The mitt may be configured to transfer an impact load to the ejection seat during an ejection event.

A method for fragilizing a canopy of an aircraft during an ejection event is disclosed herein. The method may comprise: exerting a first impulse on the canopy of the aircraft with a primary breaker; exerting a second impulse the canopy of the aircraft with a secondary breaker; and exerting a third impulse on the canopy with a deployable overhead protection assembly comprising a mitt extending forward of the primary breaker and the secondary breaker during exerting the third impulse.

In various embodiments, exerting the third impulse on the canopy with the deployable overhead protection assembly further comprises contacting the canopy with a forward end of the mitt. Exerting the third impulse on the canopy with the deployable overhead protection assembly may further comprises contacting the canopy with a piercer coupled to the mitt. The primary breaker may be a sharp breaker, the secondary breaker may be a blunt breaker, and the deployable overhead protection assembly may include a tertiary breaker. A first crack generated from the primary breaker and a second crack generated from the secondary breaker may propagate forward on the canopy in response to third impulse on the canopy with the deployable overhead protection assembly. The first impulse may be greater than the second impulse.

The foregoing features and elements may be combined in various combinations without exclusivity, unless expressly indicated otherwise. These features and elements as well as the operation thereof will become more apparent in light of the following description and the accompanying drawings. It should be understood; however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
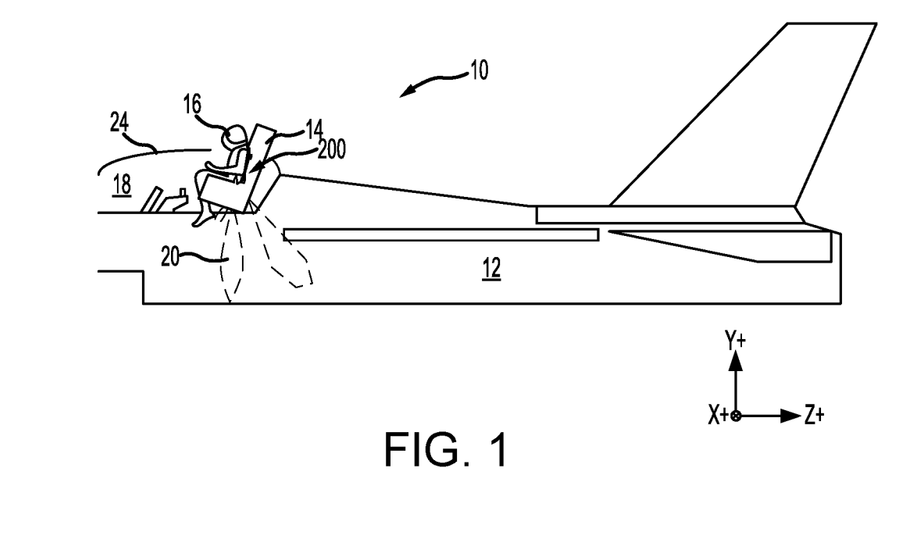
FIG. 1 illustrates an aircraft ejection system, in accordance with various embodiments.

With reference to FIG. 1, an aircraft ejection system 10 is shown, in accordance with various embodiments. Aircraft ejection system 10 may be installed in aircraft 12 to expel an ejection seat 14 and an occupant 16 of ejection seat 14 from a cockpit 18 of aircraft 12. Ejection seat 14 may be urged from cockpit 18 by a propulsion system 20. The aircraft ejection system may further comprise an element of propulsion system 20 and be configured to extract the ejection seat 14 from cockpit 18. In accordance with various embodiments, ejection seat 14 includes canopy fragilization system 200. The canopy fragilization system 200 may be configured to break a canopy 24 of the aircraft 12 in response to ejection seat 14 being propelled vertically from the aircraft 12. For example, the ejection seat 14 may include a mitt assembly configured to propagate a crack in the canopy 24 forward in the canopy 24, start the crack propagation prior to an occupant's head reaching the canopy 24, and/or transfer a contact load to the ejection seat 14. In this regard, the canopy fragilization system 200 may be configured to safely eject an occupant during a pilot ejection event.

Figure 2A:
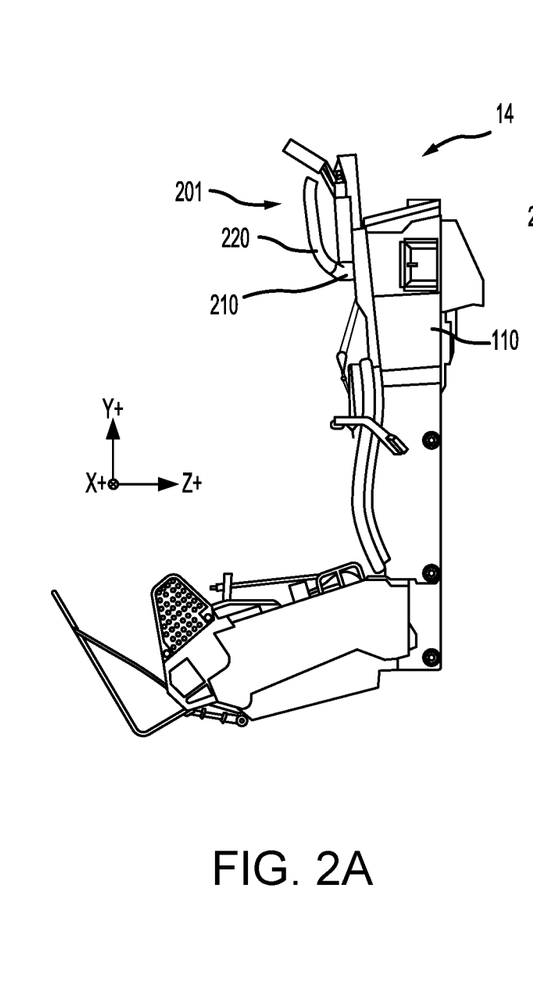
FIG. 2A illustrates a side view of an ejection seat, in accordance with various embodiments.
Figure 2B:
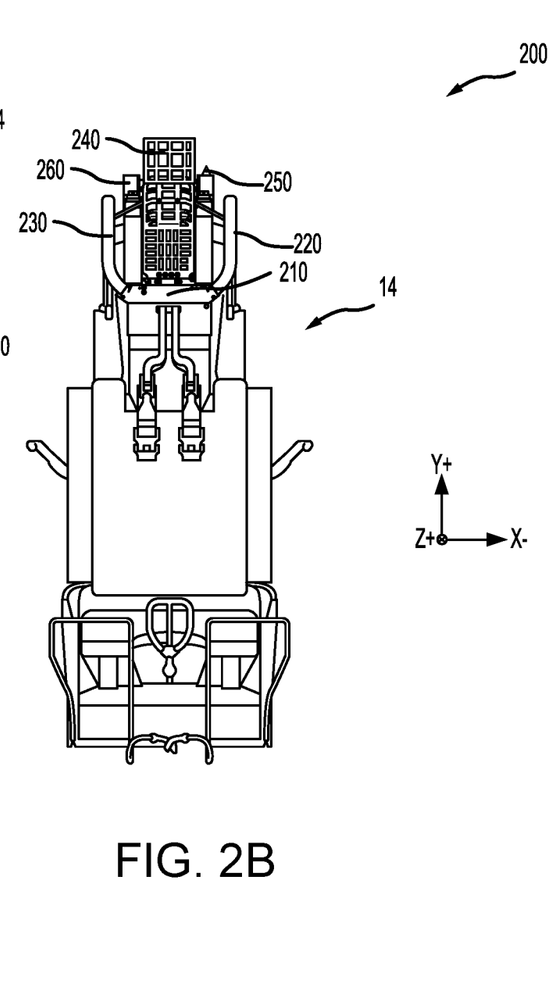
FIG. 2B illustrates a front view of an ejection seat, in accordance with various embodiments.

Referring now to FIGS. 2A and 2B, a side view (FIG. 2A) and a front view (FIG. 2B) of an ejection seat having a deployable overhead protection assembly 201 in a stowed position for use in an aircraft ejection system, is illustrated, in accordance with various embodiments. In various embodiments, an ejection seat 14 for use in an aircraft ejection system 10 from FIG. 1, comprises a canopy fragilization system 200. In various embodiments, the canopy fragilization system 200 may include a deployable overhead protection assembly 201. In various embodiments, the deployable overhead protection assembly 201 includes a base 210, a first stabilizer 220, a second stabilizer 230, and mitt 240. In various embodiments, the canopy fragilization system further comprise a primary breaker 250, and a secondary breaker 260.

In various embodiments, the base 210 is rotatably coupled to a headrest 110 of ejection seat 14. The mitt 240, the first stabilizer 220, and the second stabilizer 230 are coupled to the base 210. In various embodiments, the mitt 240 extends outward from a center portion of base 210, the first stabilizer 220 extends outward from a first side of the base 210, and the second stabilizer 230 extends outward from a second side of the base 210. When the deployable overhead protection assembly 201 is in a stowed position, the first stabilizer 220 and the second stabilizer 230 may extend forward and vertically from the base 210. "Forward" as defined herein, is in the negative z-direction (e.g., towards a front end of aircraft 12 from FIG. 1). "Vertically," as defined herein refers to the positive Y-direction. "Laterally," as defined herein refers to the X-axis. In various embodiments, the first stabilizer 220 and the second stabilizer 230 may prevent rotation of an occupant's head during an ejection event (e.g., the first stabilizer 220 and the second stabilizer 230 are configured to stabilize an occupant's head during ejection).

In various embodiments, the mitt 240 is disposed laterally between the first stabilizer 220 and the second stabilizer 230. The mitt 240 may comprise aluminum, steel, titanium, a carbon composite, or any other high strength material. In various embodiments, the mitt 240 may comprise a grid pattern, or the like. The grid pattern may produce a lower weight of the mitt 240 relative to a solid mitt, which is also within the scope of this disclosure. In various embodiments, any pattern for the mitt 240 is within the scope of this disclosure. In various embodiments, when deployed, the first stabilizer 220 may be disposed on a first side of an occupant's head and the second stabilizer 230 may be disposed on a second side of the occupant's head. In this regard, the first stabilizer 220 and the second stabilizer 230 may be configured to stabilize an occupant's head during a backup ejection mode. A "backup ejection mode," as described herein, is an ejection mode where the canopy 24 from FIG. 1 is not fragilized prior to ejection. Stated another way, a "backup ejection mode" may utilize the canopy fragilization system 200 of ejection seat 14 to fragilize the canopy 24 from FIG. 1 to eject an occupant.

In various embodiments, in a stowed position, the mitt 240 may extend vertically and forward from the base 210. In various embodiments, the mitt 240 may be configured to contribute to the fragilization of the canopy 24 from FIG. 1, as described further herein. For example, the canopy fragilization system 200 may comprise a primary breaker 250, a secondary breaker 260, and the mitt 240. In this regard, the primary breaker 250, the secondary breaker 260, and the mitt may each contribute to a fragilization of the canopy 24 from FIG. 1 during a backup ejection mode, as described further herein. In various embodiments, the primary breaker 250 may comprise a sharp breaker and the secondary breaker 260 may comprise a blunt breaker. A "sharp breaker," as defined herein, is breaker configured to generate a greater pressure on the canopy relative to the "blunt breaker." (e.g., an area of impact of a sharp breaker may be less than an area of impact of the blunt breaker. For example, a sharp breaker may exert a pressure between 2 and 20 times a blunt breaker, in accordance with various embodiments.

Figure 3:
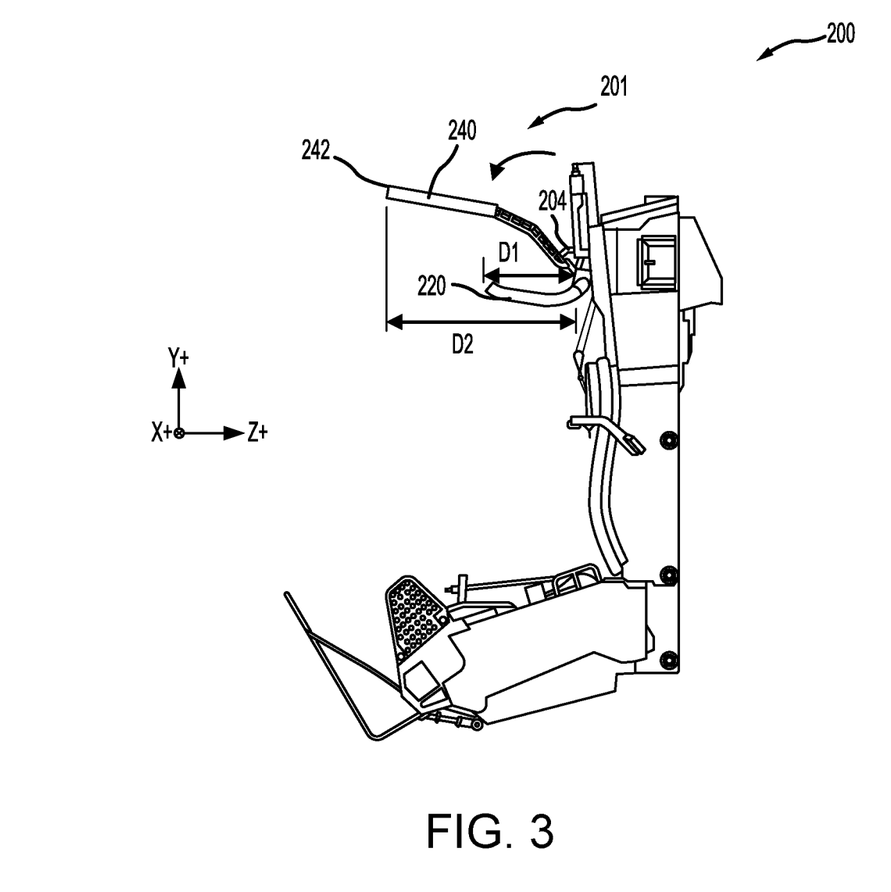
FIG. 3 illustrates a side view of an ejection seat with a deployable overhead protection assembly in a deployed position, in accordance with various embodiments.

Referring now to FIG. 3, a side view of an ejection seat having deployable overhead protection assembly in a deployed position for use in an aircraft ejection system, is illustrated, in accordance with various embodiments. In various embodiments, the deployable overhead protection assembly 201 may be configured to pivot from the stowed position (e.g., FIG. 2) to the deployed position (e.g., FIG. 3) in response to an ejection initiation by a pilot. For example, in accordance with various embodiments, the deployable overhead protection assembly 201 may further comprise a pivot mechanism 204. The pivot mechanism 204 may be configured to pivot the deployable overhead protection assembly 201 from the deployed position to the stowed position by any method known in the art. In this regard, the deployable overhead protection assembly 201 is configured to pivot about the pivot mechanism.

In various embodiments, in the deployed position, the mitt 240 may extend substantially forward from the stabilizers (e.g., first stabilizer 220 and second stabilizer 230 from FIG. 2). The first stabilizer 220 extends a first distance D1 measured in the forward directions and the mitt 240 extends a second distance D2 from the base 210 measured in the forward direction. In various embodiments, the second distance D2 may be between 1.25 and 2.5 times the distance D1, or between 1.5 and 2.5 times the distance of D1. In this regard, by extending the mitt 240 substantially past the stabilizers, the mitt 240 may extend to a front of a head of an occupant, providing greater protection to the occupant, in accordance with various embodiments. Furthermore, a front end 242 of the mitt 240 in the deployed position may be configured to contact, and fragilize, the canopy 24 from FIG. 1 in an ejection event.

In various embodiments, the front end 242 of the mitt 240 may be configured to impact the canopy 24 from FIG. 1 during an ejection event and propagate cracks produced from the primary breaker 250 and secondary breaker 260 from FIG. 2. In this regard, the front end 242 of the mitt 240 may be configured to act as a secondary breaker of the canopy 24 from FIG. 1 for the canopy fragilization system 200.

Figure 4:
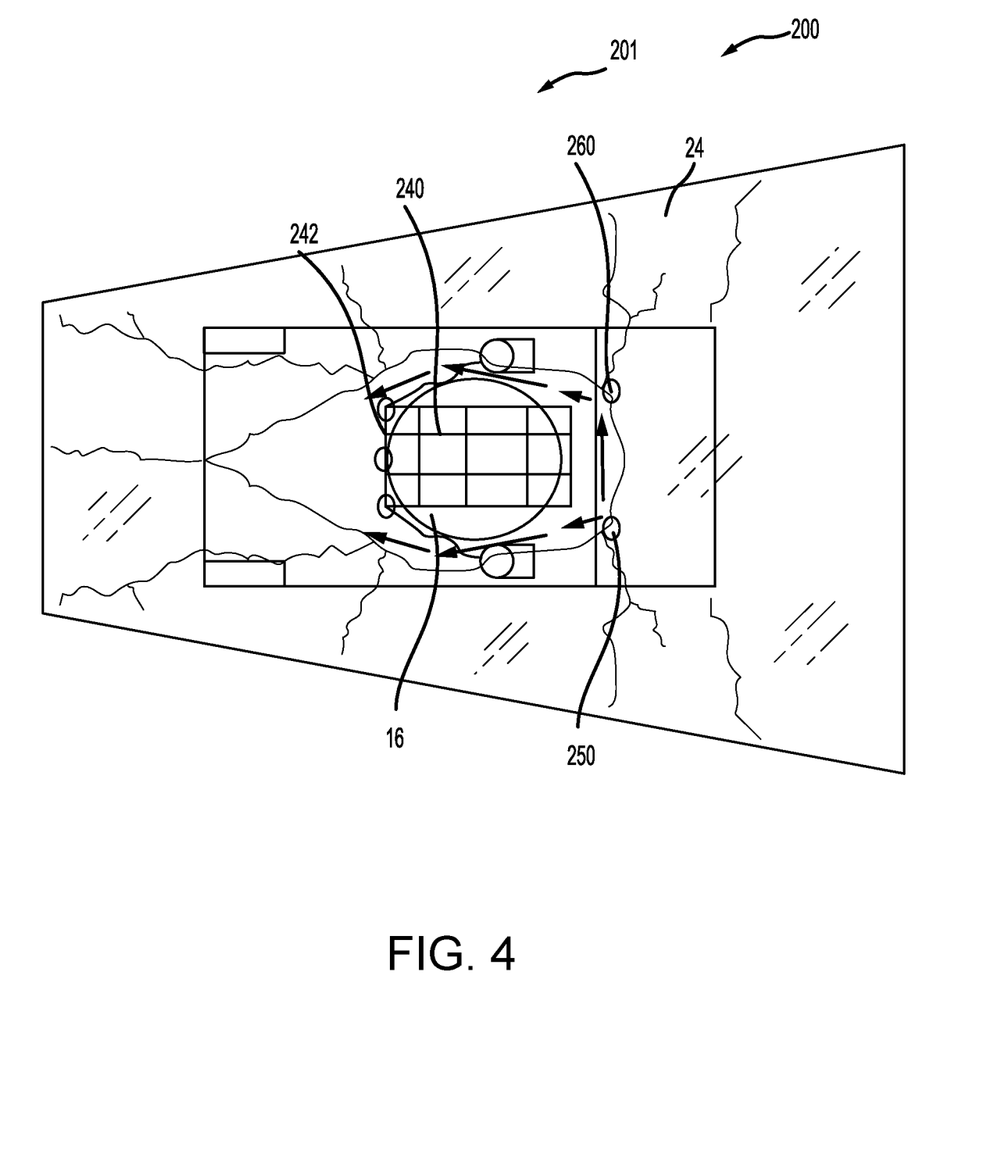
FIG. 4 illustrates a top view of a canopy fragilization system during use, in accordance with various embodiments.

With reference now to FIG. 4, a top down view of an aircraft during a backup ejection event, is illustrated, in accordance with various embodiments. Although illustrated as including a specific sequencing of impact points on canopy 24, any order of sequencing and directionality of impact locations and directionality of crack propagation is within this disclosure. For example, in accordance with various embodiments, impact locations and desired crack propagation may be determined by factors such as: (1) tolerance range of canopy material properties and geometry (e.g. thickness); (2) energy of impact range based on aircrew accommodation and seat performance factors; (3) tolerance range of canopy clearance to seat structure and occupant head/helmet at time of canopy impact accounting for aerodynamic and acceleration based deflections; and/or (4) other platform design, seat design, and aircrew population specifics.

In various embodiments, a first crack in the canopy 24 is configured to be produced by the primary breaker 250 as illustrated. In this regard, the primary breaker 250 may act as a primary breaker for the canopy fragilization system 200. Next, the secondary breaker 260 is configured to create a second crack and/or propagate the first crack laterally from the first crack and forward from the second crack. In this regard, the secondary breaker 260 may act as a secondary breaker for the canopy fragilization system 200. In various embodiments, the secondary breaker 260 may further act to push the transparency out of the way during an ejection event. In various embodiments, the front end 242 of the mitt 240 may then create a third crack and/or propagate the first crack and the second crack forward in the canopy 24. In this regard, the front end 242 of the mitt 240 may act as a tertiary breaker and/or an additional pusher for the canopy fragilization system 200. Although described as occurring in succession, in various embodiments, the impact of each breaker may occur simultaneously, or near simultaneously.

In various embodiments, the canopy fragilization system 200 is configured to break a propagate cracks around a perimeter of an occupant 30 to provide a window for the occupant to be ejected through. As such, in various embodiments, since the front end 242 of the mitt 240 contacts the canopy 24 prior to a head of the occupant 30 the crack propagation may be initiated prior to the head of the occupant 30 reaching the canopy 24, resulting in lower loads experienced by the occupant 30.

In various embodiments, when the mitt 240 is in a deployed position, the mitt 240 may extend past, or approximately flush with, a head of an occupant 30. In this regard, in accordance with various embodiments, the mitt 240 may reduce a load induced on the occupant 30 during ejection and/or transfer an impact load of the mitt 240 to the ejection seat 14 from FIGS. 1-3.

Figure 5:
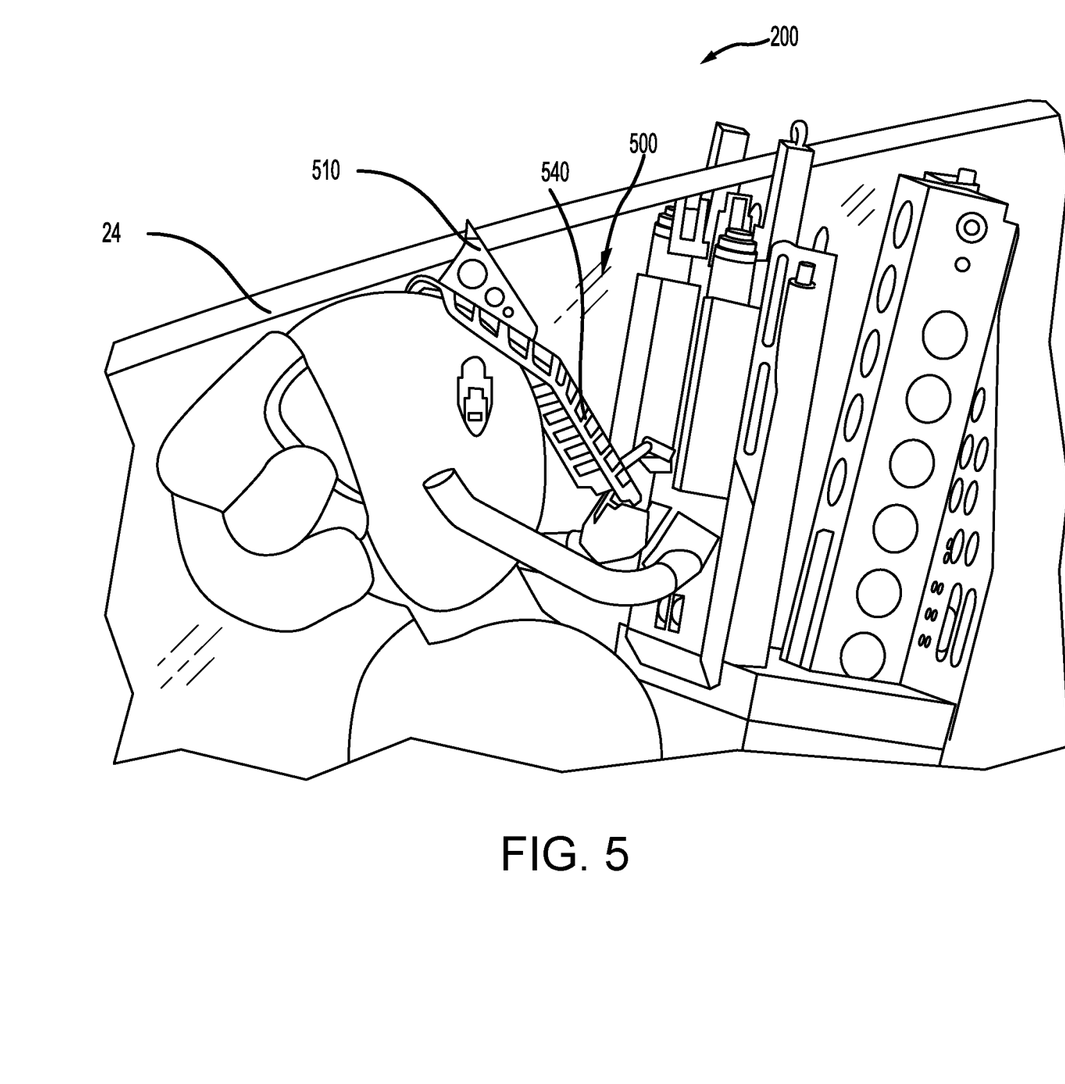
FIG. 5 illustrates a perspective view of a portion of an aircraft ejection system, in accordance with various embodiments.

Referring now to FIG. 5, a perspective view of a portion of an aircraft during a backup ejection event is illustrated, in accordance with various embodiments. In various embodiments, the canopy fragilization system 200 may comprise a deployable overhead protection assembly 500. In various embodiments, the deployable overhead protection assembly may be in accordance with the deployable overhead protection assembly 500, with the addition of a piercer 510 disposed proximate the front end 242 of the mitt 240 from FIGS. 2-4. In various embodiments, the deployable overhead protection assembly 500 may comprise a mitt 540 that extends a shorter distance forward from the head rest (e.g., distance D2) relative to the mitt 240 from FIGS. 2-4. The deployable overhead protection assembly 500 is not limited in this regard, and any distance forward of the head rest is within the scope of this disclosure. Similar to the front end of mitt 240 from FIGS. 2-4, the piercer 510 is configured to impact the canopy 24 prior to a helmet of an occupant 30 in the aircraft 12. As such, the piercer 510 of the deployable overhead protection assembly 500 may act in accordance with the front end 242 of the mitt 240 from FIGS. 2-4. For example, in various embodiments, the piercer 510 may be configured to create a third crack and/or propagate the first crack and second crack from the primary breaker 250 and the secondary breaker 260 from FIGS. 2-4. In this regard, the crack may propagate forward of the occupant 30 and create a larger window to eject the occupant 30 through the canopy 24.

In various embodiments, the piercer 510 may include a bracket portion 512 and a sharp portion 514. In various embodiments, the piercer may comprise an aerospace grade steel with a high hardness. In various embodiments, the bracket portion 512 may be coupled to the mitt 540. In various embodiments, the bracket portion 512 may be formed with, and integral to the mitt 540. For example, the bracket portion 512 and the mitt 540 may be a monolithic component (e.g., formed of a singular continuous piece).

Figure 6:
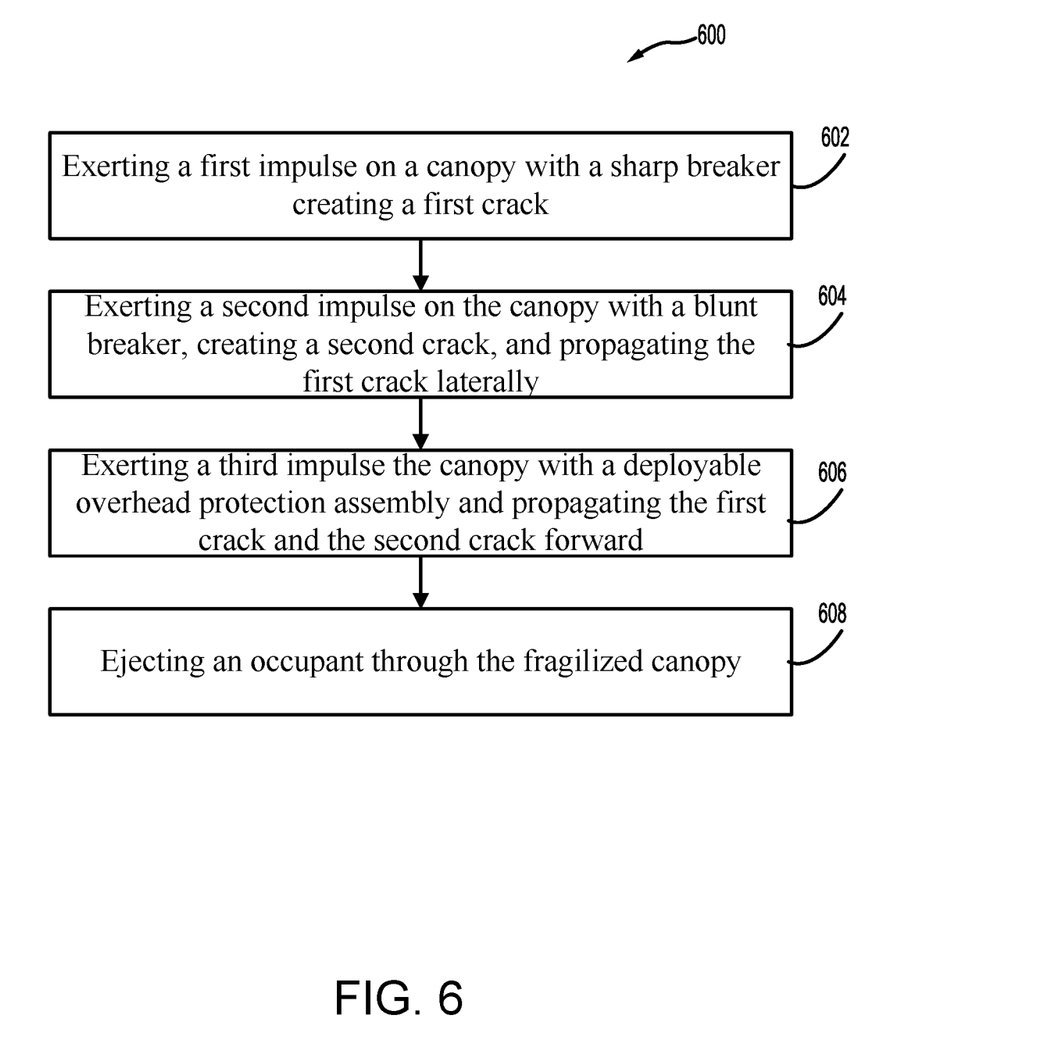
FIG. 6 illustrates a method of fragilizing a canopy, in accordance with various embodiments.

Referring now to FIG. 6, a method of using a canopy fragilization system for an aircraft during a backup mode ejection is illustrated, in accordance with various embodiments. The method 600 may comprise exerting a first impulse on a canopy with a sharp breaker and creating a first crack in the canopy (step 602). The sharp breaker may be disposed on a first side of an ejection seat (e.g., a left hand side or a right hand side). The sharp breaker may make first contact with the transparency during the backup mode ejection. The sharp breaker may be in accordance with primary breaker 250 from FIGS. 2-4.

The method 600 may further comprise exerting a second impulse on the canopy with a secondary breaker, creating a second crack, and propagating the first crack laterally (step 604). The blunt breaker may be disposed on a second side of the ejection seat opposite the first side. The blunt breaker may be in accordance with secondary breaker 260 from FIGS. 2-4. In various embodiments, the first impulse may be greater than the second impulse.

The method 600 may further comprise exerting a third impulse on the canopy with a deployable overhead protection assembly and propagating the first crack and the second crack forward (step 606). The deployable overhead protection assembly may be in accordance with deployable overhead protection assembly 201, deployable overhead protection assembly 500, or a combination of the two. In various embodiments, contacting the canopy may include contacting the canopy with a forward end of a mitt of the deployable overhead protection assembly, contacting the canopy with a piercer of the deployable overhead protection assembly, or the like.

The method 600 may further comprise ejecting an occupant through the fragilized canopy (step 608). The blunt breaker may be configured to push the canopy out of the way and eject the occupant through the fragilized canopy in accordance with various embodiments. In various embodiments, an impact load from contacting the canopy with the deployable overhead protection assembly may be transferred to the ejection seat, and/or the occupant may experience little to no impact load from the ejection.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A canopy fragilization system for use in an aircraft ejection system, the canopy fragilization system comprising:
   a sharp breaker disposed on a first side of an ejection seat, the sharp breaker configured to act as a primary breaker of a canopy of an aircraft;
   a blunt breaker disposed on a second side of the ejection seat, the blunt breaker configured to act as a secondary breaker of the canopy of the aircraft; and
   a deployable overhead protection assembly comprising a mitt extending forward of the sharp breaker and the blunt breaker when in a deployed position, a forward end of the mitt configured to act as a tertiary breaker of the canopy of the aircraft.

2. The canopy fragilization system of claim 1, wherein the blunt breaker is configured to propagate a first crack generated from the sharp breaker laterally, and wherein the forward end of the mitt is configured to propagate a second crack generated from the blunt breaker and the first crack forward along the canopy.

3. The canopy fragilization system of claim 1, wherein the mitt is configured to extend forward of a head of an occupant when in the deployed position.

4. The canopy fragilization system of claim 1, wherein the deployable overhead protection assembly further comprises a piercer disposed at the forward end of the mitt.

5. The canopy fragilization system of claim 4, wherein the piercer comprises a bracket portion and a sharp portion, the bracket portion coupled to the mitt, the sharp portion configured to pierce the canopy.

6. The canopy fragilization system of claim 1, wherein the deployable overhead protection assembly further comprises a base, a first stabilizer extending from a first side of the base and a second stabilizer extending from a second side of the base, the mitt coupled to the base and disposed laterally between the first stabilizer and the second stabilizer.

7. The canopy fragilization system of claim 6, wherein:
   the first stabilizer extends a first forward distance from a headrest when in the deployed position,
   the mitt extends a second forward distance from the headrest when in the deployed position, and the second forward distance being between about 1.5 to 2.5 times the first forward distance.

8. The canopy fragilization system of claim 1, wherein the mitt is configured to transfer an impact load to the ejection seat during an ejection event.

9. A method for fragilizing a canopy of an aircraft during an ejection event, the method comprising:
   exerting a first impulse on the canopy of the aircraft with a primary breaker;
   exerting a second impulse the canopy of the aircraft with a secondary breaker; and
   exerting a third impulse on the canopy with a deployable overhead protection assembly comprising a mitt extending forward of the primary breaker and the secondary breaker during exerting the third impulse.

10. The method of claim 9, wherein exerting the third impulse on the canopy with the deployable overhead protection assembly further comprises contacting the canopy with a forward end of the mitt.

11. The method of claim 9, wherein exerting the third impulse on the canopy with the deployable overhead protection assembly further comprises contacting the canopy with a piercer coupled to the mitt.

12. The method of claim 9, wherein:
   the primary breaker is a sharp breaker,
   the secondary breaker is a blunt breaker, and
   the deployable overhead protection assembly includes a tertiary breaker.

13. The method of claim 9, wherein a first crack generated from the primary breaker and a second crack generated from the secondary breaker propagate forward on the canopy in response to third impulse on the canopy with the deployable overhead protection assembly.

14. The method of claim 9, wherein the first impulse is greater than the second impulse.

* * * * *